United States Patent [19]
Guedalia

[11] Patent Number: 6,121,970
[45] Date of Patent: *Sep. 19, 2000

[54] METHOD AND SYSTEM FOR HTML-DRIVEN INTERACTIVE IMAGE CLIENT

[75] Inventor: Joshua Siegfried Guedalia, Jerusalem, Israel

[73] Assignee: MGI Software Corporation, Richmond Hill, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/979,220

[22] Filed: Nov. 26, 1997

[51] Int. Cl.⁷ ........................................................ G06F 3/14
[52] U.S. Cl. ............................ 345/357; 345/340; 345/356; 345/329; 345/342; 707/513; 707/517; 707/520
[58] Field of Search ....................... 345/340, 356, 345/357, 329, 335, 342, 346; 707/501, 513, 514, 515, 517, 520

[56] References Cited

U.S. PATENT DOCUMENTS

| | | | |
|---|---|---|---|
| 5,649,186 | 7/1997 | Ferguson | 707/10 |
| 5,721,851 | 2/1998 | Cline et al. | 345/349 |
| 5,742,768 | 4/1998 | Gennaro et al. | 395/200 |
| 5,793,964 | 8/1998 | Roger et al. | 395/200 X |
| 5,802,530 | 9/1998 | Van Hoff | 707/513 |
| 5,826,242 | 10/1998 | Montulli | 705/27 |
| 5,884,014 | 3/1999 | Huttenlocher et al. | 395/114 |

*Primary Examiner*—Raymond J. Bayerl
*Assistant Examiner*—Thomas T. Nguyen
*Attorney, Agent, or Firm*—Blakely, Sokoloff, Taylor & Zafman

[57] ABSTRACT

A method for archiving digital data on a server computer, and enabling a user, by means of a client computer, to interactively view a digital image derived from the digital data, including receiving by the client computer from the server computer an HTML page, the HTML page including a view window within which a first image is displayed, the view window being partitioned into a plurality of imaginary sub-regions at least one of which contains a multiplicity of pixels, selecting by the user, using a pointing device, a location within the view window corresponding to one of the plurality of sub-regions, sending by the client computer to the server computer an indication of the sub-region selected by the user, modifying by the server computer the HTML page to generate a new HTML page with a link to a second image, the second image being an enlarged portion of the first image, and the enlarged portion of the first image corresponding to the selected location, and sending by the server computer to the client computer the new HTML page.

68 Claims, 4 Drawing Sheets

METHOD AND SYSTEM FOR HTML-DRIVEN INTERACTIVE IMAGE CLIENT

FIELD OF THE INVENTION

The present invention relates to the interactive viewing of images over the Internet.

BACKGROUND OF THE INVENTION

Internet browsing is implemented through client computers, HTTP server computers and HTTP browsers. Server computers, also referred to as "servers," play the role of archives for commerce, education and entertainment, and client computers, also referred to as "clients," play the role of customers or consumers. Typically many clients connect to a single server. Special server and client software may also be employed, depending on the specific application design architecture.

An Internet browser, such as Microsoft's Internet Explorer or Netscape's Communicator, is a piece of software which resides on a client computer. When executed by a user, the browser opens a Uniform Resource Locator (URL), which resides on a server computer. Typically, the URL is a Hyper-Text Markup Language (HTML) page, which is sent back from the server to the client computer. The HTML page has instructions for the browser, which instruct the browser how to render the page for display. The page typically has additional URLs embedded in it, and when the user clicks on one of them, the server then sends a new HTML page for the browser to render.

HTML pages can contain both text and graphics, along with layout instructions. Images appearing on an HTML page also reside on the server computer, and are sent to the client when the browser finds a link to an image on the HTML page it is rendering, and then instructs the server to send the image data. The beauty of this is that the images reside on remote computers, and do not have to be stored locally on the client. Otherwise, the client would have to store every image it views, either on its hard disk or on a storage medium such as CD-ROM, regularly replacing these images with updates. Memory limitations would severely limit the number of images the client can browse, as compared with the unlimited number available on server computers today. HTML pages can also contain links to programs to run—for example, Java applets.

HTML pages can be either static or dynamic. Static pages are fixed once and for all, and every time the browser accesses such a page, the same page is sent. Dynamic pages are adaptively created by special software residing on the server. In this scenario, when the client accesses such a page, a program executes on the server which generates an HTML page on-the-fly. This page is then sent to the client. A dynamic page can be different every time it is sent to a client. This feature enables a web designer to offer a more customized experience, but requires special server software for its implementation.

Client software can take many forms, such as that of a plug-in for the browser, an Active-X control, a Java applet or a stand alone application. Each form has its relative advantages. For example, plug-ins can be developed full-scale C++ programs, offering a great deal of functionality, but they also require separate installation and are native to a specific platform. Java applets, on the other hand, automatically download from the server and install themselves, triggered by the HTML page, and are cross-platform interoperable, but Java code is more restricted than C++ and performs more slowly. Typically, client software is used as a player or viewer for special multimedia types, such as audio, still image and video, that are embedded in the HTML pages.

Similar to client software, server software can also be native to a specific platform or Java. Typically, server software is used for special access to files stored on the server, and for extra processing of data before sending it. There is often a trade-off between pre-processing data on the server side, before sending it to the client, or having the client process it after the data is received. In extreme cases, an application can be designed with server software doing all of the processing, and no client software at all; or vice versa, client software doing all of the processing, and no server software at all. Again, each choice has its relative advantages. On the one hand, client computers are typically less powerful and have less resources than server computers, indicating an advantage to letting the server do the extra processing. On the other hand, servers have to simultaneously handle many clients, and any drain on server resources inhibits response time to clients, indicating an advantage to letting the client do the extra processing.

The actual data communication between the server and the client is governed by Internet protocols, such as Hyper-Text Transfer Protocol (HTTP) and Internet Imaging Protocol (IIP). These protocols define packets of data to be sent, and can include handshakes for negotiating data-link control, to verify if the data arrived intact. Specifically, the IIP protocol sits as a layer on top of the HTTP protocol, which in turn sits as a layer on top of TCP/IP protocol. Each higher layer is higher level in its functionality; i.e. it deals with more complex data units and communication features. A reference for HTTP is the text "Illustrated Guide to HTTP" by Paul S. Hethmon ©1997 Manning Publications Co., Greenwich, Conn., 1997. A reference for the IIP is the document "Internet Imaging Protocol," ©1997 Hewlett Packard Company, Live Picture, Inc., and Eastman Kodak Company, the contents of which are hereby incorporated by reference.

One of the most challenging Internet applications is interactive viewing of images. Specifically, a large image, for example, a 360 degree panoramic vista, is stored on a server, and selected portions to be viewed are sent to a client in response to user navigation commands. As the user pans left, right, up and down, and zooms in and out of the panorama, the server sends the necessary image data to the client for rendering the appropriate view, thus providing the user with a smooth navigational experience. Effectively, the server enables the user to inspect the image interactively. Most challenging are images having large information content. The sizes of these images can be as large as hundreds of megabytes, depending on the resolution and color depth, making it impractical to simply transmit the entire image from a server to each client.

Another common type of media which is viewed by interactive navigation is large still images, which are larger than the display resolution of a monitor. The user can only view a portion of the image at any given resolution, but is able to navigate in all four directions and zoom in and out interactively, in order to inspect details of the full image.

Implementations of interactive server/client image navigation can vary. Good strategies involve (i) deciding whether or not to use special server and client software, (ii) smart caching of data which will be re-used, (iii) use of data compression, (iv) use of special data communication protocols, (v) user interface design, and much more. One approach, based on assignee's co-pending U.S. patent applications Ser. No. 08/788,830, filed Jan. 6, 1997 and entitled METHOD AND SYSTEMS FOR SCALABLE REPRESENTATION OF MULTIMEDIA DATA FOR PROGRESSIVE ASYNCHRONOUS TRANSMISSION, and Ser. No. 08/813,181, filed Mar. 7, 1997 and entitled METHOD AND SYSTEM FOR ENCODING MOVIES, PANORAMAS AND LARGE IMAGES FOR ON-LINE INTERACTIVE VIEWING AND GAZING, uses no special server software. This approach streams the image data in background, and enables the user to navigate through whatever image data has arrived at the client. A second approach, based on assignee's co-pending U.S. patent application Ser. No. 08/850,690, filed May 2, 1997 and entitled A METHOD AND SYSTEM FOR PROVIDING ON-LINE INTERACTIVITY OVER A SERVER-CLIENT NETWORK, uses special server software to serve up only the specific image data necessary to satisfy the user's request. A third approach, based on assignee's co-pending U.S. patent application Ser. No. 08/850,787, filed May 2, 1997 and entitled A METHOD AND SYSTEM FOR PROGRESSIVE ENCODING IN AN ACTIVE DESKTOP ENVIRONMENT, combines both of the abovementioned approaches by using a push mode to stream image data in background, together with a pull mode to request specific image data. The contents of the patent applications referred to in this paragraph are all hereby incorporated by reference.

HTML-driven clients for image navigation are known. The user navigation is implemented on the client side by means of dynamic HTML features, obviating the necessity of using any special client software, and making this what is referred to as a client-less architecture. The term "client-less" refers to the absence of special client software. HTML has a feature called image maps, which enables the browser to send back to the server the coordinates within an image corresponding to the location of the mouse pointer when the user clicks on the mouse. This information is used by special server software to generate an HTML page in response to the user interaction.

As described above, static HTML pages were the first and are still the most predominant mode of client/server interaction. Dynamic HTML-driven clients for interactive image navigation was implemented by Kodak in its PixFactory FLASHPIX® application, and by New Mexico Software in its IMAGE ASSETS server.

The drawback with this client-less approach to image navigation is that it is very processing-heavy on the server side. For every interactive user command, the server has to render a customized image to embed in the dynamic HTML page. Given the rapid pace with which interactive user commands are issued, this puts a heavy burden on the server, greatly slowing down its performance. Moreover the combined latency of the server processing and the network communication makes the user experience a "bumpy" rather than a "smooth" interactive experience; i.e. the navigation experience appears more like a slide show than a continuous animation.

SUMMARY OF THE INVENTION

The present invention provides a novel approach to client-less HTML-driven interactive image navigation over the Internet. It operates through the medium of image maps, and is designed in such a way as to allow for efficient caching on both the client and server sides, so as to reduce network latency for the client and also boost server performance.

The invention operates by partitioning the view window, in which the client is displaying changing images as the user navigates. The window region is partitioned in a number of sub-regions. These sub-regions are typically not visible to the user. Whenever the user clicks on the image being displayed, the browser sends the mouse pointer coordinates back to the server. The server then calculates which sub-region these coordinates belong to, and dynamically embeds a corresponding response image into the HTML page being returned to the client. In effect, the user navigation is being "quantized" into a number of possible responses. Typically this number is small (less than 10), and correspondingly, for each image currently being displayed, there are only a small number of different images for display in response to user navigation.

The server's role is simply to identify which of these images is to be displayed in response to a specific interactive user command, and to prepare that image in a form that the browser recognizes, such as JPEG. A primary advantage of this form of quantization is that typically the user will return to the same image over and over. Thus by caching these images within the client, the client provides an instant interactive response whenever the user navigates back to the same image. Moreover, by caching these images within the server, redundant processing for multiple clients can be eliminated, enabling the server to respond quickly to many clients simultaneously.

There is thus provided in accordance with a preferred embodiment of the present invention a method for archiving digital data on a server computer, and enabling a user, by means of a client computer, to interactively view a digital image derived from the digital data, including receiving by the client computer from the server computer an HTML page, the HTML page including a view window within which a first image is displayed, the view window being partitioned into sub-regions at least one of which contains a multiplicity of pixels, selecting by the user a location within the view window corresponding to one of the sub-regions, sending by the client computer to the server computer an indication of the sub-region selected by the user, creating by the server computer a new HTML page with a link to an embedded image which corresponds to the indication, and sending by the server computer to the client computer the new HTML page.

Moreover in accordance with a preferred embodiment of the present invention the selecting step includes positioning a pointer for a mouse input device on a pixel within the view window, and clicking on the mouse input device.

Additionally in accordance with a preferred embodiment of the present invention the indication is the location of the pixel pointed to by the mouse input device.

Further in accordance with a preferred embodiment of the present invention the method also includes the step of identifying that one of the sub-regions within which the pixel location is situated.

Still further in accordance with a preferred embodiment of the present invention the first sending step also includes sending client state information to the server computer.

Moreover in accordance with a preferred embodiment of the present invention the client state information includes the size and location of the view window.

Additionally in accordance with a preferred embodiment of the present invention the method also includes the step of associating image portions with each of the sub-regions, and wherein the embedded image is that image portion corresponding to that sub-region indicated by the indication.

Moreover in accordance with a preferred embodiment of the present invention some of the image portions are derived from portions of the digital data.

Further in accordance with a preferred embodiment of the present invention some of the image portions correspond to magnified portions of the first image.

Still further in accordance with a preferred embodiment of the present invention some of the image portions correspond to the portions of the first image which lie within the sub-regions associated with the image portions, magnified to the size of the view window.

Moreover in accordance with a preferred embodiment of the present invention some of the image portions correspond to portions of the first image which lie in regions strictly larger than the sub-regions associated with the image portions, magnified to the size of the view window.

Further in accordance with a preferred embodiment of the present invention some of the image portions extend outside of the first image.

Additionally in accordance with a preferred embodiment of the present invention the creating step is implemented by means of a Java server.

Moreover in accordance with a preferred embodiment of the present invention the creating step is implemented by means of a Java servlet.

Further in accordance with a preferred embodiment of the present invention the link to an embedded image is a sequence of commands from the Internet Imaging Protocol (IIP).

Still further in accordance with a preferred embodiment of the present invention the sequence of commands from the IIP includes a convert (CVT) command.

Moreover in accordance with a preferred embodiment of the present invention the sequence of commands from the IIP includes a region (RGN) command.

Additionally in accordance with a preferred embodiment of the present invention the sequence of commands from the IIP includes a width (WID) command.

Further in accordance with a preferred embodiment of the present invention the sequence of commands from the IIP includes a height (HEI) command.

Still further in accordance with a preferred embodiment of the present invention the digital data is a tiled multi-resolution image file, such as a FLASHPIX® image file.

Moreover in accordance with a preferred embodiment of the present invention the embedded image is built from tiles within a multi-resolution image file, such as a FLASHPIX® image file.

There is also provided in accordance with a preferred embodiment of the present invention a method for interactive viewing of a digital image by a user, the viewing being controlled by a client computer, employing digital data residing on a server computer, including receiving by the client computer an HTML page from the server, the HTML page including a view window within which image data is displayed, the view window being partitioned into sub-regions at least one of which contains a multiplicity of pixels, selecting by the user a location within the view window corresponding to one of the sub-regions, and receiving by the client computer a new HTML page from the server, in response to the sub-region which was selected.

Moreover in accordance with a preferred embodiment of the present invention the selecting step includes positioning a pointer for a mouse input device on a pixel within the view window, and clicking on the mouse input device.

Additionally in accordance with a preferred embodiment of the present invention the digital data is a tiled multi-resolution image file, such as a FLASHPIX® image file.

Further in accordance with a preferred embodiment of the present invention the new HTML page contains a link to an embedded image.

Still further in accordance with a preferred embodiment of the present invention the link to an embedded image is a sequence of commands from the Internet Imaging Protocol (IIP).

Moreover in accordance with a preferred embodiment of the present invention the sequence of commands from the IIP includes a convert (CVT) command.

Additionally in accordance with a preferred embodiment of the present invention the sequence of commands from the IIP includes a region (RGN) command.

Further in accordance with a preferred embodiment of the present invention the sequence of commands from the IIP includes a width (WID) command.

Still further in accordance with a preferred embodiment of the present invention the sequence of commands from the IIP includes a height (HEI) command.

Moreover in accordance with a preferred embodiment of the present invention the embedded image is built from tiles within a multi-resolution image file, such as a FLASHPIX® image file.

There is also provided in accordance with a preferred embodiment of the present invention a method for generating dynamic HTML pages on a server computer, to enable a user to interactively view a digital image on a client computer within a view window which is partitioned into sub-regions at least one of which contains a multiplicity of pixels, by interactive selecting of sub-regions by the user, including receiving from the client computer an indication of which of the sub-regions is selected by the user, creating an HTML page with a link to an embedded image which corresponds to the indication, and sending the HTML page to the client computer.

Moreover in accordance with a preferred embodiment of the present invention the indication is the location of a pixel pointed to by a mouse input device attached to the client computer.

Additionally in accordance with a preferred embodiment of the present invention the method also includes the step of identifying that sub-region within which the pixel location is situated.

Further in accordance with a preferred embodiment of the present invention the receiving step also includes receiving client state information.

Still further in accordance with a preferred embodiment of the present invention the client state information includes the size and location of the view window.

Moreover in accordance with a preferred embodiment of the present invention the method also includes including the step of associating image portions with each of the sub-regions, and wherein the embedded image is that image portion corresponding to the sub-region indicated by the indication.

Additionally in accordance with a preferred embodiment of the present invention the creating step is implemented by means of a Java server.

Moreover in accordance with a preferred embodiment of the present invention the creating step is implemented by means of a Java servlet.

Further in accordance with a preferred embodiment of the present invention the link to an embedded image is a sequence of commands from the Internet Imaging Protocol (IIP).

Still further in accordance with a preferred embodiment of the present invention the sequence of commands from the IIP includes a convert (CVT) command.

Moreover in accordance with a preferred embodiment of the present invention the sequence of commands from the IIP includes a region (RGN) command.

Additionally in accordance with a preferred embodiment of the present invention the sequence of commands from the IIP includes a width (WID) command.

Further in accordance with a preferred embodiment of the present invention the sequence of commands from the IIP includes a height (HEI) command.

Still further in accordance with a preferred embodiment of the present invention the digital image is a tiled multi-resolution image, such as a FLASHPIX® image.

Moreover in accordance with a preferred embodiment of the present invention the embedded image is built from tiles within a multi-resolution image file, such as a FLASHPIX® image file.

There is also provided in accordance with a preferred embodiment of the present invention an archival system for archiving digital data on a server computer, and enabling a user, by means of a client computer, to interactively view a digital image derived from the digital data, including a receiver for receiving by the client computer from the server computer an HTML page, the HTML page including a view window within which a first image is displayed, the view window being partitioned into sub-regions at least one of which contains a multiplicity of pixels, an input device for selecting by the user a location within the view window corresponding to one of the sub-regions, a first transmitter for sending by the client computer to the server computer an indication of the sub-region selected by the user, a processor for creating by the server computer a new HTML page with a link to an embedded image which corresponds to the indication, and a second transmitter for sending by the server computer to the client computer the new HTML page.

Additionally in accordance with a preferred embodiment of the present invention the input device is a keyboard.

Moreover in accordance with a preferred embodiment of the present invention the input device includes a mouse input device for positioning a pointer on a pixel within the view window, and a mouse key for clicking on the mouse input device.

Additionally in accordance with a preferred embodiment of the present invention the indication is the location of the pixel pointed to by the mouse input device.

Further in accordance with a preferred embodiment of the present invention the system also includes a coordinate processor for identifying that one sub-regions within which the pixel location is situated.

Still further in accordance with a preferred embodiment of the present invention the first transmitter also sends client state information to the server computer.

Moreover in accordance with a preferred embodiment of the present invention the client state information includes the size and location of the view window.

Additionally in accordance with a preferred embodiment of the present invention the system also includes a list of image portions for associating image portions with each of the sub-regions, and wherein the embedded image is that image portions corresponding to the sub-region indicated by the indication.

Moreover in accordance with a preferred embodiment of the present invention some of the image portions are derived from portions of the digital data.

Further in accordance with a preferred embodiment of the present invention some of the image portions correspond to magnified portions of the first image.

Still further in accordance with a preferred embodiment of the present invention some of the image portions correspond to the portions of the first image which lie within the sub-regions associated with the image portions, magnified to the size of the view window.

Moreover in accordance with a preferred embodiment of the present invention some of the image portions correspond to portions of the first image which lie in regions strictly larger than the sub-regions associated with the image portions, magnified to the size of the view window.

Further in accordance with a preferred embodiment of the present invention some of the image portions extend outside of the first image.

Additionally in accordance with a preferred embodiment of the present invention the processor is a Java server.

Moreover in accordance with a preferred embodiment of the present invention the processor is a Java servlet.

Further in accordance with a preferred embodiment of the present invention the link to an embedded image is a sequence of commands from the Internet Imaging Protocol (IIP).

Still further in accordance with a preferred embodiment of the present invention the sequence of commands from the IIP includes a convert (CVT) command.

Moreover in accordance with a preferred embodiment of the present invention the sequence of commands from the IIP includes a region (RGN) command.

Additionally in accordance with a preferred embodiment of the present invention the sequence of commands from the IIP includes a width (WID) command.

Further in accordance with a preferred embodiment of the present invention the sequence of commands from the IIP includes a height (HEI) command.

Still further in accordance with a preferred embodiment of the present invention the digital data is a tiled multi-resolution image file, such as a FLASHPIX® image file.

Moreover in accordance with a preferred embodiment of the present invention the embedded image is built from tiles within a multi-resolution file, such as a FLASHPIX® image file.

There is also provided in accordance with a preferred embodiment of the present invention a client viewing system for interactive viewing of a digital image by a user, the viewing being controlled by a client computer, employing digital data residing on a server computer, including a receiver for receiving by the client computer an HTML page from the server computer, the HTML page including a view window within which image data is displayed, the view window being partitioned into a plurality of sub-regions at least one of which contains a multiplicity of pixels, an input device for selecting by the user a location within the view window corresponding to one of the sub-regions, and a receiver for receiving by the client computer a new HTML page from the server, in response to the sub-region which was selected.

Additionally in accordance with a preferred embodiment of the present invention the input device is a keyboard.

Further in accordance with a preferred embodiment of the present invention the input device includes a mouse input device for positioning a pointer on a pixel within the view window, and a mouse key for clicking on the mouse input device.

Still further in accordance with a preferred embodiment of the present invention the digital data is a tiled multi-resolution image file, such as a FLASHPIX® image file.

Moreover in accordance with a preferred embodiment of the present invention the new HTML page contains a link to an embedded image.

Additionally in accordance with a preferred embodiment of the present invention the link to an embedded image is a sequence of commands from the Internet Imaging Protocol (IIP).

Further in accordance with a preferred embodiment of the present invention the sequence of commands from the IIP includes a convert (CVT) command.

Still further in accordance with a preferred embodiment of the present invention the sequence of commands from the IIP includes a region (RGN) command.

Moreover in accordance with a preferred embodiment of the present invention the sequence of commands from the IIP includes a width (WID) command.

Additionally in accordance with a preferred embodiment of the present invention the sequence of commands from the IIP includes a height (HEI) command.

Further in accordance with a preferred embodiment of the present invention the embedded image is built from tiles within a multi-resolution image file, such as a FLASHPIX® image file.

There is also provided in accordance with a preferred embodiment of the present invention a server dynamic HTML system for generating dynamic HTML pages on a server computer, to enable a user to interactively view a digital image on a client computer within a view window which is partitioned into sub-regions at least one of which contains a multiplicity of pixels, by interactive selecting of sub-regions by the user, including a receiver for receiving from the client computer an indication of which of the sub-regions is selected by the user, a processor for creating an HTML page with a link to an embedded image which corresponds to the indication, and a transmitter for sending the HTML page to the client computer.

Moreover in accordance with a preferred embodiment of the present invention the indication is the location of a pixel pointed to by a mouse input device attached to the client computer.

Additionally in accordance with a preferred embodiment of the present invention the system also includes a coordinate processor for identifying that sub-region within which the pixel location is situated.

Further in accordance with a preferred embodiment of the present invention the receiver also receives client state information.

Still further in accordance with a preferred embodiment of the present invention the client state information includes the size and location of the view window.

Moreover in accordance with a preferred embodiment of the present invention the system also includes a list of image portions for associating image portions with each of the sub-regions, and wherein the embedded image is that image portion corresponding to the sub-region indicated by the indication.

Additionally in accordance with a preferred embodiment of the present invention the processor is a Java server.

Moreover in accordance with a preferred embodiment of the present invention the processor is a Java servlet.

Further in accordance with a preferred embodiment of the present invention the link to an embedded image is a sequence of commands from the Internet Imaging Protocol (IIP).

Still further in accordance with a preferred embodiment of the present invention the sequence of commands from the IIP includes a convert (CVT) command.

Moreover in accordance with a preferred embodiment of the present invention the sequence of commands from the IIP includes a region (RGN) command.

Further in accordance with a preferred embodiment of the present invention the sequence of commands from the IIP includes a width (WID) command.

Still further in accordance with a preferred embodiment of the present invention the sequence of commands from the IIP includes a height (HEI) command.

Moreover in accordance with a preferred embodiment of the present invention the digital image is a tiled multi-resolution image, such as a FLASHPIX® image.

Additionally in accordance with a preferred embodiment of the present invention the embedded image is built from tiles within a multi-resolution image file, such as a FLASH-PIX® image file.

There is also provided in accordance with a preferred embodiment of the present invention a method for archiving digital data on a computer and enabling a user to interactively view a digital image derived from the digital data, including receiving from the computer a layout including a view window within which an image is displayed, the view window being partitioned into sub-regions at least one of which contains a multiplicity of pixels, selecting by the user a location within the view window corresponding to one of the sub-regions, and providing by the computer to the user a layout including a reference to an image which corresponds to the sub-region selected by the user.

Moreover in accordance with a preferred embodiment of the present invention the selecting step includes positioning a pointer for a mouse input device on a pixel within the view window, and clicking on the mouse input device.

Additionally in accordance with a preferred embodiment of the present invention the method also includes the step of associating image portions with each of the sub-regions, and wherein the reference to an image is a reference to that image portion corresponding to the sub-region selected by the user.

Further in accordance with a preferred embodiment of the present invention some of the image portions are derived from portions of the digital data.

Still further in accordance with a preferred embodiment of the present invention the digital data is a tiled multi-resolution image file, such as a FLASHPIX® image file.

Moreover in accordance with a preferred embodiment of the present invention the reference to an image is a reference to a multi-resolution image, such as a FLASHPIX® image.

There is also provided in accordance with a preferred embodiment of the present invention a system for archiving digital data on a computer and enabling a user to interactively view a digital image derived from the digital data, including a layout including a view window within which an image is displayed, the view window being partitioned into sub-regions at least one of which contains a multiplicity of pixels, an input device for selecting by the user a location within the view window corresponding to one of the sub-regions, and a layout including a reference to an image which corresponds to the sub-region selected by the user.

Moreover in accordance with a preferred embodiment of the present invention the input device includes a mouse input device for positioning a pointer on a pixel within the view window, and a mouse key for clicking on the mouse input device.

Additionally in accordance with a preferred embodiment of the present invention the system also includes a list of image portions for associating image portions with each of the sub-regions, and wherein the reference to an image is a reference to that image portion corresponding to the sub-region selected by the user.

Further in accordance with a preferred embodiment of the present invention some of the image portions are derived from portions of the digital data.

Still further in accordance with a preferred embodiment of the present invention the digital data is a tiled multi-resolution image file, such as a FLASHPIX® image file.

Moreover in accordance with a preferred embodiment of the present invention the reference to an image is a reference to a multi-resolution image, such as a FLASHPIX® image.

DETAILED DESCRIPTION OF PREFERRED EMBODIMENTS

The present invention concerns a client/server architecture for interactive viewing of image data. Specifically, it deals with large images, where the full resolution image cannot be downloaded over the Internet quickly, and also may not fit within a viewing window on a computer monitor. Instead the user can view only a portion of the image at any given instant, and inspects the image by interactively manipulating it so that various portions, possibly at various resolutions, are displayed in the view window in response to user commands.

The basic units of interactivity when viewing large images are pan and zoom. Panning involves sliding the portion of the image being viewed left, right, up and down. Zooming involves zooming in on parts of the image (magnification) to see finer detail, and zooming out (reduction) to see a larger portion of the image, with less detail, in the same view window.

When viewing flat 2-D images, the portion of the image being viewed is based directly upon the stored image data. When viewing panoramas (360 degree vistas), which are mapped onto geometrical surfaces such as cylinders or spheres, the portion of the image being viewed is transformed from stored image data, corresponding to the appropriate projection that maps the surface onto the current view plane along the lines of sight of the viewer. Each view requires a distinct transformations for its view plane.

Client/server systems operate by archiving the image data on a server computer, and enabling client computers to connect via the Internet and access the image data. In this way, the image data is made available to a broad audience of users, and it is not necessary for the client computers to store a local copy of the image data. This is especially advantageous in light of the large size of the image data files, and the limited memory resources on the client computer. Client/server systems make it possible for users to view an unlimited number of images.

A primary drawback with client/server systems is network latency, which causes delays in data access via the Internet. Waiting for large amounts of data to download is annoying to users, and thus interactive application designers prefer to operate by transmitting just enough data for rendering the image portion to be displayed. However, for both flat 2-D and panoramic images, in order to render the portion of the image to be displayed, the client computer has to have received a corresponding portion of the archived image data from the server computer. This in turn requires that new data be transmitted in response to each interactive user command, which leads to a non-smooth interactive user experience, whereby the navigation appears to proceed in "spurts."

For multimedia such as flat 2-D images and panoramas, whereby the user typically accesses the same data repeatedly while navigating, caching can alleviate the network latency problem to a limited extent. Ideally the user experience should be independent of whether the images being viewed are stored remotely on servers or locally on the user's disk.

Figure 1:
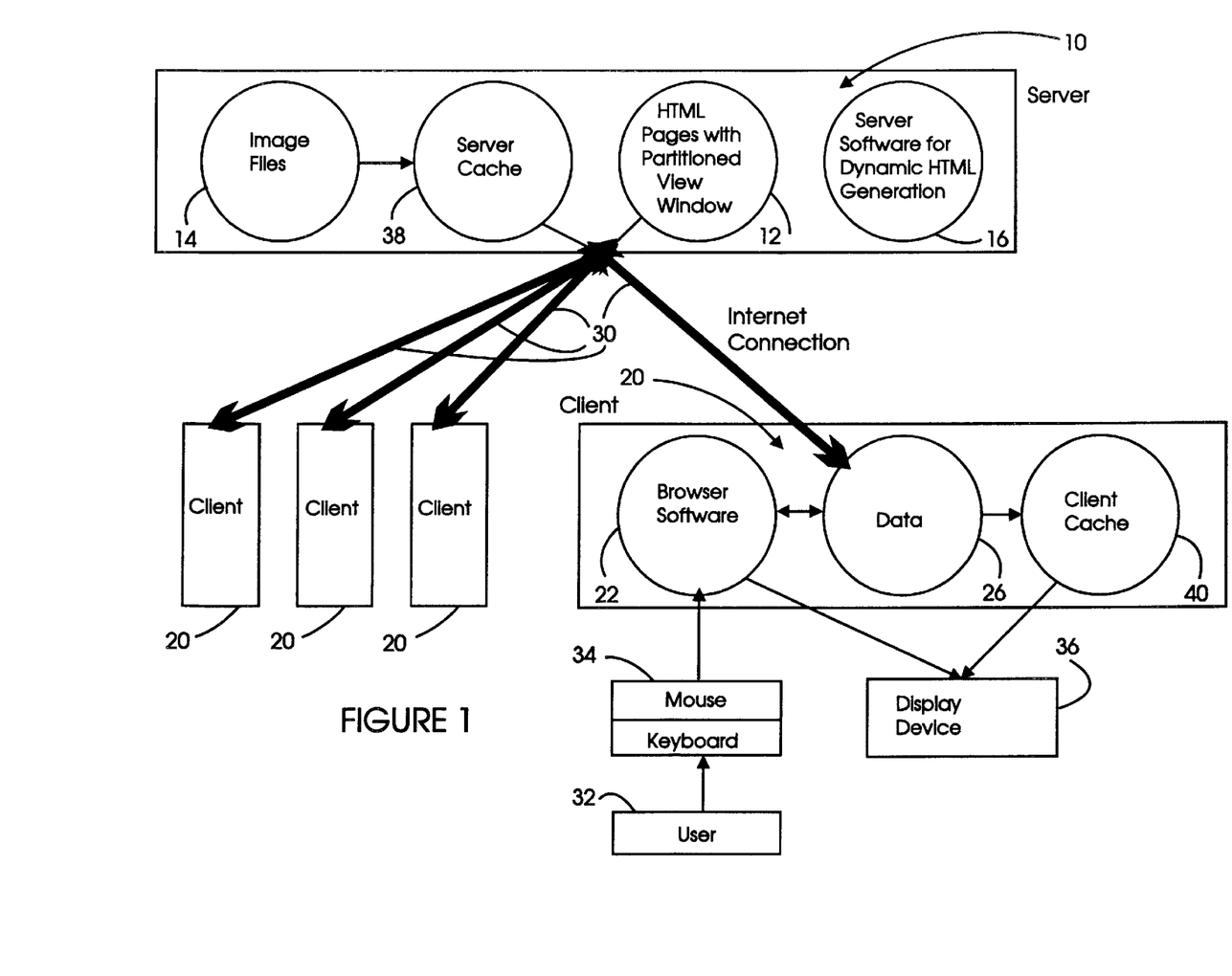
FIG. 1 is a simplified diagram illustrating an Internet communication configuration between a client and a server.

Referring to FIG. 1, there is depicted a simplified diagram of a client/server system. As is known in the prior art, a server computer 10 contains HTML pages 12, each of which contains display layout information, URL links for embedding images, and instructions to launch server applications such as Java applications, referred to as "Java servers," and Java applets, referred to as "Java servlets." The embedded images are derived from image files 14 residing on the server, and the server applications are stored as server software 16 on the server.

In accordance with a preferred embodiment of the present invention, the HTML pages 12 contain viewing windows which are partitioned into a plurality of sub-regions, and the server software is used to dynamically generate HTML pages in response to user selection of sub-regions.

At remote sites several client computers 20 are connected to the server 10. Each client computer contains browser software 22, such as Netscape Navigator or Microsoft Internet Explorer. The browser software 22 communicates with the server computer 10, and controls transmission of data 26, which includes HTML, applet, image and other data, from the server to the client. The data 26 is either used directly by the browser to display the HTML page, or, if necessary or preferred, the optional client software 24 is invoked.

The vehicle for connecting the clients to the server is the Internet, with its multitude of connections 30. Requests for data along such a connection should comply with an Internet protocol, such as HTTP's GET command, or those of other protocols such as FTP or SMTP.

A user 32, who operates the client computer 20, interactively controls the image portion displayed within the HTML page by means of an input device such as a mouse and keyboard 34. The HTML page with the image portion embedded therein is displayed on a display device 36. The user 32 views the display screen and in turn adjusts the image portion being viewed by issuing commands via the mouse and keyboard 34.

Additionally, the server can use its local cache 38 to store image data that can be repeatedly requested. This is especially efficient if the data portions transmitted from server to client require special assembly from the data in the image files 14. In a preferred embodiment of the present invention, the image files 14 are FLASHPIX® files. FLASHPIX® is a multi-resolution tiled format. Specifically, a high resolution image is pre-filtered into a pyramid of lower resolution images, all of which are stored with the full resolution image within the FLASHPIX® file. In addition, all of the individual resolution images are partitioned into tiles, which are blocks of contiguous image data. Currently the FLASH-PIX® format employs tiles of 64×64 pixels. The tiles can be individually compressed. A reference for FLASHPIX® is the document "FlashPix Format Specification," ©1996, 1997, Eastman Kodak Company.

In order to construct a specific image portion at a specific resolution, it is necessary to assemble ("stitch") together all of the tiles from the specific resolution that are part of the specific portion. For example, generating a 256×256 image portion from a given resolution may involve assembling a 4×4 array of tiles. An application may be designed so as to send the tiles directly to the client, unassembled, in which case the client has to assemble them by means of client software in the form of a plug-in, Active-X control or Java applet.

Alternatively, an application may be designed to have the server do the assembly, and transmit the assembled image portion to the client. In this case, the browser software 22 may be able to display the image portion directly, without the need to use client software.

Complementing FLASHPIX®, there exists the Internet Imaging Protocol (IIP), which is a set of commands for requesting data from a FLASHPIX® image file. When the application operates by sending unassembled tiles from the server 10 to the client 20, the client issues a tile (TIL) command, specifying a single tile or multiple tiles to be transmitted. In turn, the client receives each tile individually, typically in compressed format.

Alternatively, when the application operates by assembling the tiles into an image portion on the server, the client issues a convert (CVT) command, specifying a rectangular region of the image along with a display resolution. The server then functions to identify which resolution in the FLASHPIX® image pyramid is appropriate for the specified region and display resolution, and which tiles are required. It extracts those tiles from the image file, assembles them together into a rectangular image portion, and typically compresses the resulting image. The final result is transmitted to the client for display.

Server cache 38 can be used to save assembled image portions for re-use, in case other clients request the same image portion, or in case the same client navigates back to the same image portion. Having image portions available saves the assembly processing, yielding faster response time.

Similarly a client cache 40 can also be used to store image portions for future re-use. On account of the limited memory available for caching, both servers and clients have to implement smart caching algorithms when their caches are full, to decide what data to keep and what data to discard.

Figure 2:
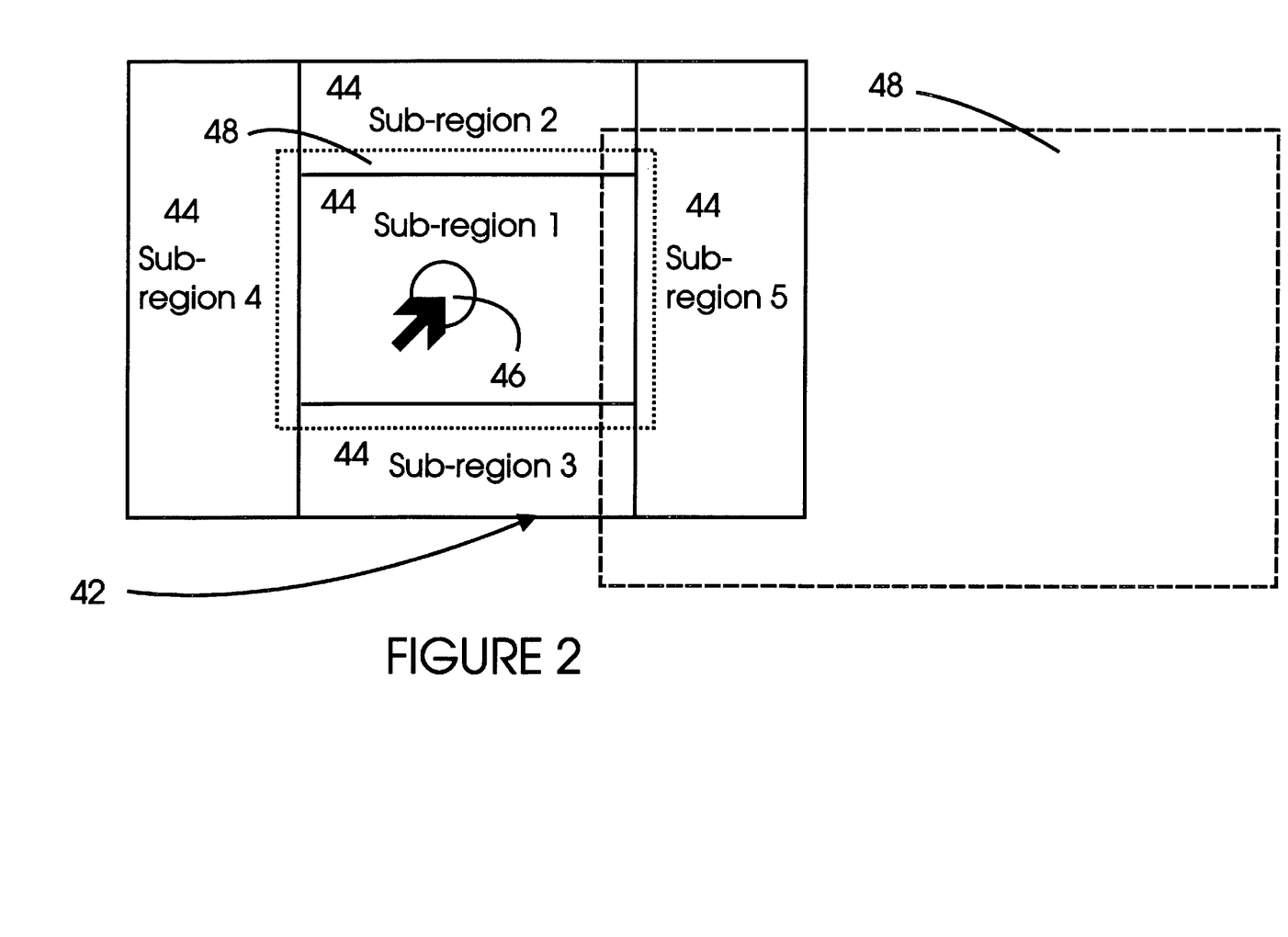
FIG. 2 is a diagram illustrating a partition of an image region into sub-regions.

Referring now to FIG. 2, there is shown a viewing window 42, which is typically part of an HTML page layout. The image portion being viewed by the user is displayed in this window. In a preferred embodiment of the present invention, the viewing window 42 is partitioned into imaginary sub-regions 44. These sub-regions are imaginary in the sense that they are not visible to the user, but are used for computational purposes.

FIG. 2 illustrates an example of zooming in. The user positions a mouse pointer 46 at a position within the view window, and clicks on the mouse. This issues a request to zoom in on the portion of the image where the mouse pointer is located. In a preferred embodiment, the present invention operates by identifying a specific image portion, associated with the sub-region containing the mouse pointer 46, to be magnified.

FIG. 2 illustrates a partition containing five sub-regions 44, indicated by the solid lines in FIG. 2. The user selects one of these sub-regions by clicking at a location in the view window. In turn, each of these sub-regions is used to trigger the server to embed an appropriate image portion in the server's response. Specifically, in a preferred embodiment of the present invention, each of these sub-regions is associated with a rectangular region 48, indicated for sub-region 1 by the dotted lines in FIG. 2. When the user clicks within a particular sub-region 44, the image portion to be used for the response is the region 48 associated with that selected sub-region 44.

Shown in FIG. 2 are two examples of response regions 48. The first example is the region marked by the dotted lines. It contains sub-region 1, but is itself contained with the view window. The response image portion is magnified to fit the size of the full view window, giving the effect of a zoom-in.

The advantage of choosing response regions 48 that are strictly larger than the sub-regions 44, is that when the user clicks on the boundary of a sub-region, the location clicked upon is strictly within the image portion displayed in response, making it easy for the user to relate the response image to the previous image. However, it is apparent that one could instead choose the response regions to coincide with the sub-regions, or in almost any arbitrary way.

The second example of a response region in FIG. 2 is the region surrounded by the dashed lines. It is the same size as the view window, but extends rightward and downward outside the current image data being viewed. Display of this image portion gives the effect of an upward leftward motion.

Internet browsers provide a mechanism, referred to as image maps, for carrying out this process. Image maps enable a browser to extract the coordinates of the location of the mouse pointer when the user clicks on the mouse, and send these coordinates back to the server. The server in turn receives these coordinates and calculates that sub-region within which they are situated. FIG. 2 illustrates a user clicking within sub-region 1.

In order to calculate the sub-region within which the mouse coordinates are located, the server also needs to know the size and location of the view window; i.e. client state information. This client state information can also be sent from the client to the server, together with the mouse coordinates. Alternatively, the server can store this information in its own memory.

Figure 3:
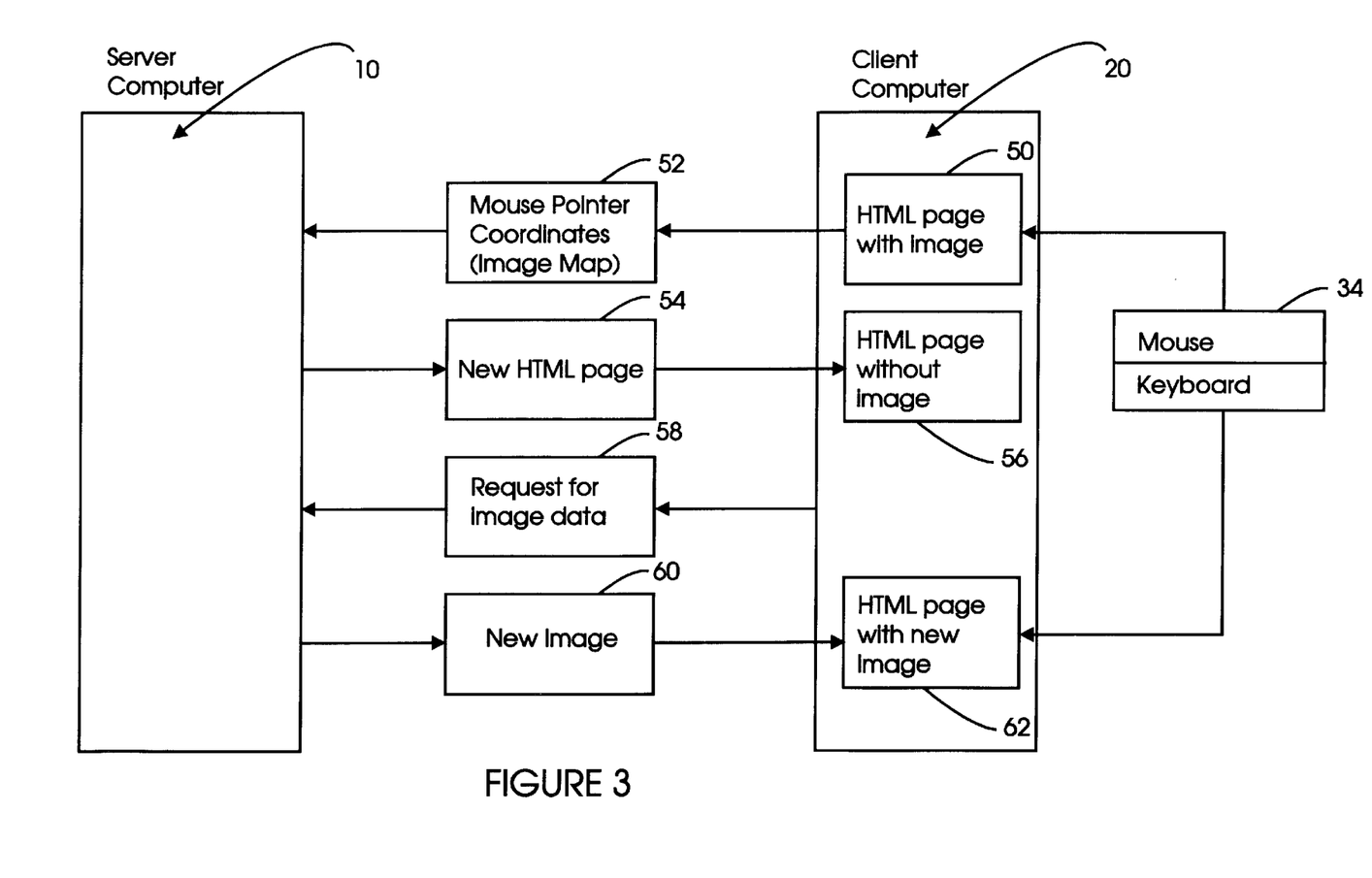
FIG. 3 is a simplified flow chart indicating the operation of a preferred embodiment of the present invention in response to a single user command.

FIG. 3 illustrates a simplified flow chart for one step in a preferred embodiment of the present invention. After an initial request is made, an HTML page 50 is displayed on a client computer 20. The HTML page contains within it a view window, such as that illustrated in FIG. 2 and described hereinabove, within which an embedded image portion is displayed. Using a mouse or keyboard 34 for positioning, the user clicks on the mouse at a position within the view window. HTML identifies the image portion being viewed as an image map, and the client sends the mouse pointer coordinates 52 to the server computer 10. The server computer 10 calculates the sub-region within which the mouse coordinates are situated, and dynamically creates a new HTML page 54, with a link to an embedded image, constituting the response to the user mouse click.

The client computer first receives the HTML page 56, without having the data for rendering the embedded image. In a preferred embodiment of the present invention, the HTML page 56 identifies the image portion to be embedded as a URL with a sequence of IIP commands. The IIP command sequence contains a reference to the FLASH- PIX® image file, a specification of the region of the FLASH-PIX® image to be displayed, information about the pixel dimensions of the view window, and a CVT command.

The browser encounters the IIP command sequence and sends an IIP request for image data 58 to the server. The server parses the request, accesses the necessary FLASH-PIX® image tiles, assembles them into a rectangular image portion 60, and sends the new image back to the client. In turn, the client then displays the HTML page with the new image portion embedded within it.

Appendix A contains examples of three HTML pages, corresponding to an initial view of an image and two successive zoom-ins. Appendix B contains a listing of the software which was used to generate these pages.

It is apparent to those skilled in the art that the image portion being displayed can also be viewed without the HTML page, as a stand alone image.

Figure 4:
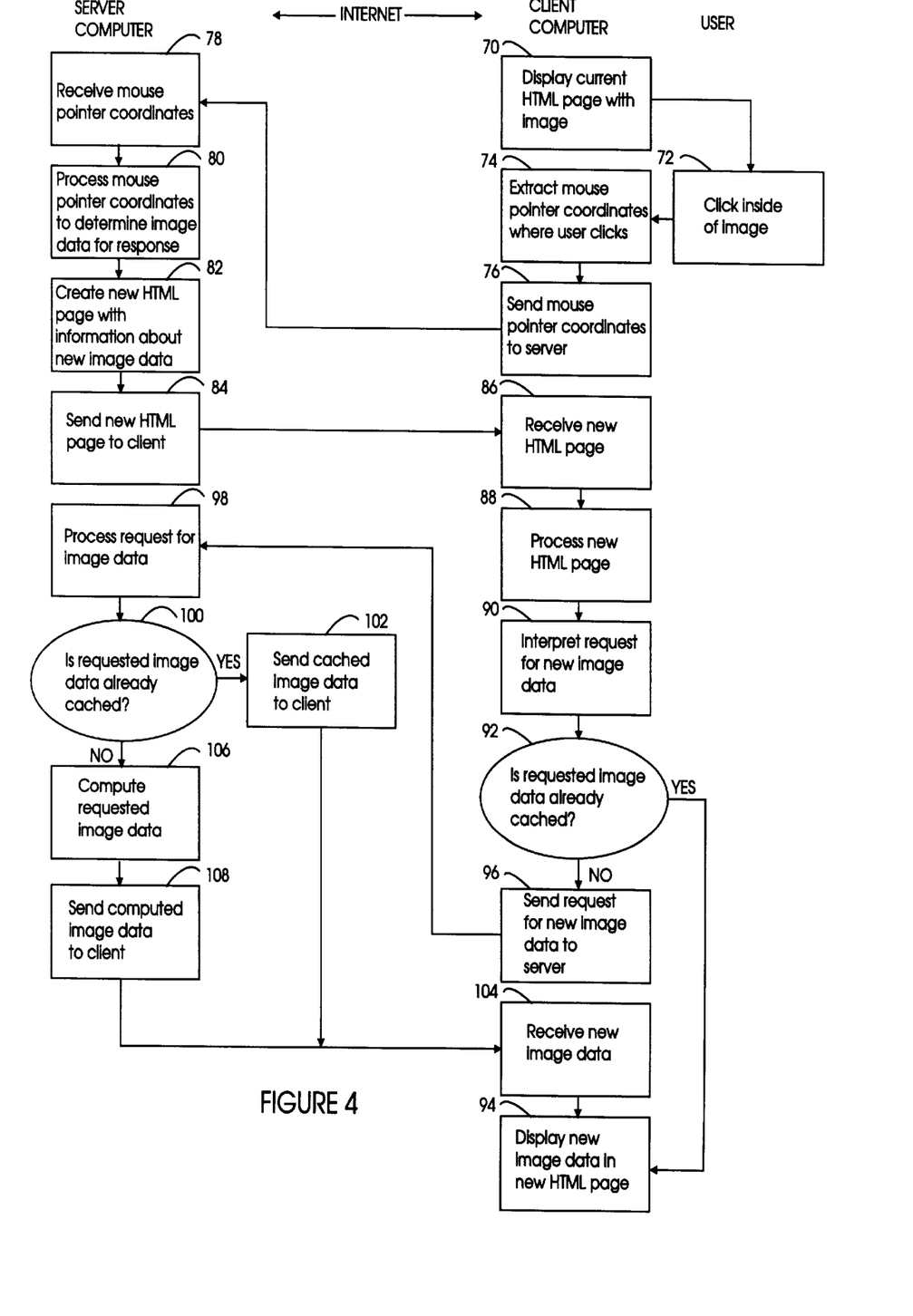
FIG. 4 is a simplified flowchart of the operation of a preferred embodiment of the present invention.

Referring to FIG. 4, there is illustrated a simplified flowchart of a preferred embodiment of the present invention. When the browser first accesses an HTML page on the server, the page is sent to the client with an initial layout. The initial HTML page can be either static or dynamic. At step 70 the current HTML page is displayed with an image portion embedded therewithin. At step 72 the user viewing the page clicks on a location within the view window that contains the embedded image portion. The browser extracts the mouse pointer coordinates where the user clicked at step 74, and sends them to the server at step 76.

At step 78 the server receives the mouse pointer coordinates, and at step 80 the server calculates which sub-region contains these coordinates. It then identifies the image portion to be used for the response, based on the sub-region calculated. At step 82 the server dynamically creates a new HTML page with a link to indicate the response image portion. In a preferred embodiment of the present invention, the link is an IIP command sequence. Examples of such an HTML page are provided in Appendix A, and Appendix B contains a listing of the software which was used to generate them. At step 84 the server sends the newly created HTML page back to the client.

At step 86 the client receives the new HTML page, and at step 88 the browser processes the page. At step 90 the browser recognizes that the HTML page contains a link to an embedded image portion. At step 92 the client checks whether that embedded image portion is already resident in its local cache. If so, then the page can be displayed at once at step 94, with the embedded image rendered. Otherwise, at step 96 the client sends the request for the image portion back to the server. Internet browsers support caching, so it is not necessary to use special client software for this.

At step 98 the server processes the request for the image portion. In a preferred embodiment of the present invention, this entails parsing the IIP command sequence, to translate the IIP syntax into specific instructions. At step 100 the server checks whether the requested image portion is already resident in its local cache. If so, it immediately sends the cached image data to the client, at step 102, and the client receives the data at step 104. Otherwise, at step 106 the server produces the requested image data. In a preferred embodiment of the present invention, this entails accessing the appropriate tiles from the specified FLASHPIX® image file, and assembling them together. At step 108 the server sends the computed image data to the client.

The client receives the image data at step 104 and displays the HTML page with the embedded image rendered at step 94. At this point, the step of going from one displayed HTML page to another, in response to an interactive user request, is complete, and the step can be repeated.

The above description has been stated in terms of a zooming user request, but it is apparent to those skilled in the art that it applies equally well to panning. What makes the present invention applicable is simply the quantization of the user navigation responses.

Current HTML-driven client applications such as New Mexico Software's IMAGE ASSETS server customize each response to the exact user navigation command. For example, when zooming in, they respond with a magnified image portion which is exactly centered at the location of the mouse pointer. As a result, there is significantly less re-use of the same image portions, since the user rarely navigates back to exactly the same configuration, and the advantage offered by caching is almost entirely eliminated. In turn, the server must carry out the processing of each image portion, as in step 106 of FIG. 4, which drains the server and slows down its response time.

Thus it will be appreciated that the present invention is enabling for technologies which desire to avoid using client software and rely instead on dynamic HTML.

The initial view contains two images. The HREF for the first image launches the HtmlClient servlet. Its parameters indicate a FLASHPIX® image file cat.fpx, a full window region from (0,0) to (1,1) in normalized coordinates, and pixel dimensions of 280×280. The HREF for the second image indicates the same parameters for a FLASHPIX® image file fruit.fpx.

The two images themselves are designated by URLs that each contain three IIP commands: FIF, OBJ and JTL. The FIF command serves to identify the image file. The OBJ= IIP,1.0 serves to indicate the IIP version number, and is currently required as part of the syntax of any IIP request. The JTL=0,0 command requests a single tile, tile number 0 of resolution number 0, in JPEG format. Since resolution number 0 is the lowest resolution, this single tile contains a thumbnail of the entire image.

The HTML page for the zoomed-in view indicates that the user clicked somewhere in the middle of the view window with the cat.fpx image. The HREF indicates a rectangular region from (0.25,0.25) to (0.75,0.75), which is consistent with the IIP region command RGN=0.25,0.25,0.5,0.5. (The last two parameters here are the width and height.) It also indicates a width of 280 pixels. Thus the embedded image is displayed at twice the magnification level as the previous image.

The HTML page for the further zoomed-in view indicates that the user clicked somewhere in the upper right-hand corner of the view window. The HREF indicates a rectangular region from (0.5,0.25) to (0.75,0.5). Again, the embedded image is at twice the magnification level as the previous image.

Notice the use of two ports in these HTML pages. Port 8080 is used to launch the Java servlet. Port 8787 is used for the IIP requests.

Specifically, as described above, the browser sends both client state information and mouse coordinates to the server. The tokens received are the view window delimiters x1o, y1o, x2o, y2o, the pixel dimensions w, h, and the relative mouse coordinates x, y. The arrays click_array_x1[ ], click_array_y1[ ], click_array_x2[ ], click_array_y2[ ] specify five sub-regions. For example, the first sub-region is the middle rectangle extending from (0.25,0.25) to (0.75, 0.75), and the second sub-region is the L-shaped area in the lower left, described by the part of the rectangle extending from (0.0,0.0) to (0.5,0.5) which excludes the previous rectangle. The arrays goto_array_x1[ ], goto_array_y1[ ], goto_array_x2[ ] and goto_array_y2[ ] specify the image portion to be used for the response. In the example shown, the first response portion is the image portion in the middle rectangle extending from (0.25,0.25) to (0.75,0.75), and the second response portion is the image portion in the lower left rectangle extending from (0.0,0.0) to (0.5,0.5).

The out.print calls at the end of the listing do the actual writing of the dynamic HTML page.

It will be appreciated by persons skilled in the art that the present invention is very broad, and has many extensions beyond those scenarios described hereinabove. It is apparent that the present invention is not limited to still images and panoramas, but applies to other types of multimedia as well. For example, it applies to object movies and slide shows, whereby the response to a user request made while viewing a current frame of the movie or slide show, is to display a different frame.

It is also apparent that the use of sub-regions in the present invention can be complemented by or replaced with user interface buttons, so that clicking on a specific button corresponds to selecting a specific sub-region. In both cases (sub-regions and buttons) the image map enables the client to send back a pixel location to the server, knowledge of which enables the server to determine the appropriate response.

It is also apparent that the present invention applies to digital image data stored within a single file, or distributed among multiple files.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

What is claimed is:

1. A method for archiving digit data on a server computer, and enabling a user, by means of a client computer, to interactively view a digital image derived from said digital data, comprising:

receiving by said client computer from said server computer an HTML page, said HTML page including a view window within which a first image is displayed, said view window being partitioned into a plurality of imaginary sub-regions, at least one of which contains a multiplicity of pixels;

selecting by said user, using a pointing device, a location within said view window corresponding to one of said plurality of sub-regions;

sending by said client computer to said server computer an indication of the sub-region selected by said user;

modifying, by said server computer using server-side software, the HTML page to generate a new HTML page with a link to a second image, the second image being an enlarged portion of the first image, and the enlarged portion of the first image corresponding to the selected location; and sending by said server computer to said client computer said new HTML page.

2. A method according to claim 1 wherein said selecting comprises pressing said pointing device when said pointing device points to a pixel location within said view window, and wherein said indication is the pixel location, and wherein the method also includes identifying that one of said sub-regions within which said pixel location is situated.

3. A method according to claim 1 and wherein said first sending step also includes sending client state information to said server computer.

4. A method according to claim 3 and wherein said client state information includes the size and location of said view window.

5. A method according to claim 1 and wherein said link to a second image is a sequence of commands from the Internet Imaging Protocol (IIP).

6. A method according to claim 5 and wherein said sequence of commands from the IIP includes a convert (CVT) command.

7. A method according to claim 5 and wherein said sequence of commands from the IIP includes a region (RGN) command.

8. A method according to claim 5 and wherein said sequence of commands from the IIP includes a width (WID) command.

9. A method according to claim 5 and wherein said sequence of commands from the IIP includes a height (HEI) command.

10. A method according to claim 1 and wherein said digital data is a tiled multi-resolution image file, such as a FLASHPIX® image file.

11. A method according to claim 1 and wherein said second image is built from tiles within a multi-resolution image file, such as a FLASHPIX® image file.

12. A method for interactive viewing of a digital image by a user, said viewing being controlled by a client computer, employing digital data residing on a server computer, comprising:

receiving by said client computer a first HTML page from said server computer, said first HTML page including a view window within which a first image is displayed, said view window being partitioned into a plurality of imaginary sub-regions at least one of which contains a multiplicity of pixels;

selecting by said user, using a pointing device, a location within said view window corresponding to one of said plurality of sub-regions;

receiving by said client computer a second HTML page, generated by said server computer, in response to said sub-region which was selected, wherein said second HTML page contains a link to a second image, the second image being an enlarged portion of the first image, and the enlarged portion of the first image corresponding to the selected location; and repeating said selecting and said receiving of said second HTML page at least once, with the second HTML page being used in place of the first HTML page in each successive repetition.

13. A method according to claim 12 and wherein said digital data is a tiled multi-resolution image file, such as a FLASHPIX® image file.

14. A method according to claim 12 and wherein said link to a second image is a sequence of commands from the Internet Imaging Protocol (IIP).

15. A method according to claim 14 and wherein said sequence of commands from the IIP includes a convert (CVT) command.

16. A method according to claim 14 and wherein said sequence of commands from the IIP includes a region (RGN) command.

17. A method according to claim 14 and wherein said sequence of commands from the IIP includes a width (WID) command.

18. A method according to claim 14 and wherein said sequence of commands from the IIP includes a height (HEI) command.

19. A method according to claim 12 and wherein said link to a second image is a link to an image built from tiles within a multi-resolution image file, such as a FLASHPIX® image file.

20. A method for generating dynamic HTML pages on a server computer, to enable a user to interactively view a digital image on a client computer within a view window which is partitioned into imaginary sub-regions at least one of which contains a multiplicity of pixels, by interactive selecting of said sub-regions by said user, comprising:

receiving from said client computer an indication of which of said sub-regions is selected by said user;

creating, using server-side software, a modified HTML page with a link to an image, the image being a portion of the digital image, and the portion of the digital image corresponding to the selected sub-region; and sending said modified HTML page to said client computer.

21. A method according to claim 20 and wherein said indication is the location of a pixel pointed to by a mouse input device attached to said client computer.

22. A method according to claim 21 and also including identifying that one of said sub-regions within which said pixel location is situated.

23. A method according to claim 20 and wherein said receiving also includes receiving client state information.

24. A method according to claim 23 and wherein said client state information includes the size and location of said view window.

25. A method according to claim 20 and wherein said link to an image is a sequence of commands from the Internet Imaging Protocol (IIP).

26. A method according to claim 25 and wherein said sequence of commands from the IIP includes a convert (CVT) command.

27. A method according to claim 25 and wherein said sequence of commands from the IIP includes a region (RGN) command.

28. A method according to claim 25 and wherein said sequence of commands from the IIP includes a width (WID) command.

29. A method according to claim 25 and wherein said sequence of commands from the IIP includes a height (HEI) command.

30. A method according to claim 20 and wherein said digital image is a tiled multi-resolution image, such as a FLASHPIX® image.

31. A method according to claim 20 and wherein said link to an image is a link to an image built from tiles within a multi-resolution image file, such as a FLASHPIX® image file.

32. An archival system for archiving digital data on a server computer, and enabling a user, by means of a client computer, to interactively view a digital image derived from said digital data, comprising:

a receiver for receiving by said client computer from said server computer an HTML page, said HTML page including a view window within which a first image is displayed, said view window being partitioned into a plurality of imaginary sub-regions at least one of which contains a multiplicity of pixels;

a pointing device for selecting by said user a location within said view window corresponding to one of said plurality of sub-regions;

a first transmitter for sending by said client computer to said server computer an indication of the sub-region selected by said user;

a processor for modifying, by said server computer using server-side software, the HTML page to generate a new HTML page with a link to a second image, the second image being an enlarged portion of the first image, and the enlarged portion of the first image corresponding to the selected location; and a second transmitter for sending by said server computer to said client computer said new HTML page.

33. A system according to claim 32 wherein said pointing device positions a pointer on a pixel location within said view window, and wherein said indication is the pixel location, and wherein the system also includes a coordinate processor for identifying that one of said sub-regions within which said pixel location is situated.

34. A system according to claim 32 and wherein said first transmitter also sends client state information to said server computer.

35. A system according to claim 34 and wherein said client state information includes the size and location of said view window.

36. A system according to claim 32 and wherein said link to a second image is a sequence of commands from the Internet Imaging Protocol (IIP).

37. A system according to claim 36 and wherein said sequence of commands from the IIP includes a convert (CVT) command.

38. A system according to claim 36 and wherein said sequence of commands from the IIP includes a region (RGN) command.

39. A system according to claim 36 and wherein said sequence of commands from the IIP includes a width (WID) command.

40. A system according to claim 36 and wherein said sequence of commands from the IIP includes a height (HEI) command.

41. A system according to claim 32 and wherein said digital data is a tiled multi-resolution image file, such as a FLASHPIX® image file.

42. A system according to claim 32 and wherein said second image is built from tiles within a multi-resolution image file, such as a FLASHPIX® image file.

43. A client viewing system for interactive viewing of a digital image by a user, said viewing being controlled by a client computer, employing digital data residing on a server computer, comprising:

a receiver for receiving by said client computer a first HTML page from said server computer, said first HTML page including a view window within which a first image is displayed, said view window being partitioned into a plurality of imaginary sub-regions at least one of which contains a multiplicity of pixels;

a pointing device for repeatedly selecting by said user a location within said view window corresponding to one of said plurality of sub-regions; and a receiver for repeatedly receiving by said client computer a second HTML page, generated by said server computer, in response to said sub-region which was selected, wherein said second HTML page contains a link to a second image, the second image being an enlarged portion of the first image, and the enlarged portion of the first image corresponding to the selected location, and wherein the second HTML page is used in place of the first HTML page when the pointing device is next used to select a location within said view window.

44. A system according to claim 43 and wherein said digital data is a tiled multi-resolution image file, such as a FLASHPIX® image file.

45. A system according to claim 43 and wherein said link to a second image is a sequence of commands from the Internet Imaging Protocol (IIP).

46. A system according to claim 45 and wherein said sequence of commands from the IIP includes a convert (CVT) command.

47. A system according to claim 45 and wherein said sequence of commands from the IIP includes a region (RGN) command.

48. A system according to claim 45 and wherein said sequence of commands from the IIP includes a width (WID) command.

49. A system according to claim 45 and wherein said sequence of commands from the IIP includes a height (HEI) command.

50. A system according to claim 43 and wherein said link to a second image is a link to an image built from tiles within a multi-resolution image file, such as a FLASHPIX® image file.

51. A server dynamic HTML system for generating dynamic HTML pages on a server computer, to enable a user to interactively view a digital image on a client computer within a view window which is partitioned into imaginary sub-regions at least one of which contains a multiplicity of pixels, by interactive selecting of said sub-regions by said user, comprising:

a receiver for receiving from said client computer an indication of which of said sub-regions is selected by said user;

a processor for creating, using server-side software, a modified HTML page with a link to an image, the image being a portion of the digital image, and the portion of the digital image corresponding to the selected sub-region; and a transmitter for sending said modified HTML page to said client computer.

52. A system according to claim 51 and wherein said indication is the location of a pixel pointed to by a mouse input device attached to said client computer.

53. A system according to claim 52 and also including a coordinate processor for identifying that one of said sub-regions within which said pixel location is situated.

54. A system according to claim 51 and wherein said receiver also receives client state information.

55. A system according to claim 54 and wherein said client state information includes the size and location of said view window.

56. A system according to claim 51 and wherein said link to an image is a sequence of commands from the Internet Imaging Protocol (IIP).

57. A system according to claim 56 and wherein said sequence of commands from the IIP includes a convert (CVT) command.

58. A system according to claim 56 and wherein said sequence of commands from the IIP includes a region (RGN) command.

59. A system according to claim 56 and wherein said sequence of commands from the IIP includes a width (WID) command.

60. A system according to claim 56 and wherein said sequence of commands from the IIP includes a height (HEI) command.

61. A system according to claim 51 and wherein said digital image is a tiled multi-resolution image, such as a FLASHPIX® image.

62. A system according to claim 51 and wherein said link to an image is a link to an image built from tiles within a multi-resolution image file, such as a FLASHPIX® image file.

63. A method for archiving digital data on a server computer and enabling a user to interactively view a digital image derived from said digital data, comprising:

receiving from said server computer a first layout including a view window within which a first image is displayed, said view window being partitioned into a plurality of imaginary sub-regions at least one of which contains a multiplicity of pixels;

selecting by said user, using a pointing device, a location within said view window corresponding to one of said plurality of sub-regions; and providing by said server computer to said user, using server-side software, a second layout, generated by said server computer by modifying the first layout, including a reference to a second image, the second image being an enlarged portion of the first image, and the enlarged portion of the first image corresponding to the location selected by said user.

64. A method according to claim 63 and wherein said digital data is a tiled multi-resolution image file, such as a FLASHPIX® image file.

65. A method according to claim 63 and wherein said reference to a second image is a reference to a multi-resolution image, such as a FLASHPIX® image.

66. A system for archiving digital data on a server computer and enabling a user to interactively view a digital image derived from said digital data, comprising:

a first layout including a view window within which a first image is displayed, said view window being partitioned into a plurality of imaginary sub-regions at least one of which contains a multiplicity of pixels;

a pointing device for selecting by said user a location within said view window corresponding to one of said plurality of sub-regions; and a second layout, generated by said server computer using server-side software, by modifying the first layout, including a reference to a second image, the second image being an enlarged portion of the first image, and the enlarged portion of the first image corresponding to the location selected by said user.

67. A system according to claim 66 and wherein said digital data is a tiled multi-resolution image file, such as a FLASHPIX® image file.

68. A system according to claim 66 and wherein said reference to a second image is a reference to a multi-resolution image, such as a FLASHPIX® image.

* * * * *